(12) United States Patent
Wakazono et al.

(10) Patent No.: US 9,616,340 B2
(45) Date of Patent: Apr. 11, 2017

(54) COMPUTER DEVICE, STORAGE MEDIUM, AND METHOD OF CONTROLLING COMPUTER DEVICE

(71) Applicant: Capcom Co., Ltd., Osaka-shi, Osaka (JP)

(72) Inventors: Kouji Wakazono, Osaka (JP); Yuichi Sakatani, Osaka (JP)

(73) Assignee: Capcom Co., LTD., Osaka-shi (JP)

( * ) Notice: Subject to any disclaimer, the term of this patent is extended or adjusted under 35 U.S.C. 154(b) by 190 days.

(21) Appl. No.: 14/404,432

(22) PCT Filed: May 28, 2013

(86) PCT No.: PCT/JP2013/003348
§ 371 (c)(1),
(2) Date: Nov. 26, 2014

(87) PCT Pub. No.: WO2013/179641
PCT Pub. Date: Dec. 5, 2013

(65) Prior Publication Data
US 2015/0148125 A1 May 28, 2015

(30) Foreign Application Priority Data

May 29, 2012 (JP) ................................. 2012-121560

(51) Int. Cl.
*A63F 13/00* (2014.01)
*A63F 13/57* (2014.01)
(Continued)

(52) U.S. Cl.
CPC .............. *A63F 13/57* (2014.09); *A63F 13/22* (2014.09); *A63F 13/245* (2014.09); *A63F 13/42* (2014.09);
(Continued)

(58) Field of Classification Search
CPC .......... A63F 13/22; A63F 13/25; A63F 13/50; A63F 13/52; A63F 13/55; A63F 13/56; A63F 13/57
(Continued)

(56) References Cited

U.S. PATENT DOCUMENTS

2007/0072662 A1* 3/2007 Templeman ............ A63F 13/00
463/6

FOREIGN PATENT DOCUMENTS

EP 2072098 A1 6/2009
EP 2266673 A2 12/2010
(Continued)

OTHER PUBLICATIONS

European Patent Office, Extended European Search Report Issued in Application No. 13796310.4, Feb. 11, 2016, 3 pages.
(Continued)

*Primary Examiner* — James S McClellan
(74) *Attorney, Agent, or Firm* — Alleman Hall McCoy Russell & Tuttle LLP

(57) ABSTRACT

Provided are a computer device, a storage medium, and a method of controlling the computer device, which enable a player character to perform various actions according to the user's intention. A game program causes a CPU of a game device to function as a game space generating section and a PC control section. The PCU control section causes the CPU to function as a movement control section and a stance control section. The stance control section increases the variation in the player character's stance changed from a reference stance, with an increase in the operation amount of a second operation unit, and decreases the variation in the player character's stance changed from the reference stance, with a decrease in the operation amount of the second operation unit.

6 Claims, 8 Drawing Sheets

(51) Int. Cl.
  *A63F 13/79*    (2014.01)
  *A63F 13/63*    (2014.01)
  *A63F 13/53*    (2014.01)
  *A63F 13/837*   (2014.01)
  *A63F 13/245*   (2014.01)
  *A63F 13/42*    (2014.01)
  *A63F 13/22*    (2014.01)

(52) U.S. Cl.
  CPC .............. *A63F 13/53* (2014.09); *A63F 13/63* (2014.09); *A63F 13/79* (2014.09); *A63F 13/837* (2014.09); *A63F 2300/1018* (2013.01); *A63F 2300/6045* (2013.01); *A63F 2300/8076* (2013.01)

(58) Field of Classification Search
  USPC .......................................................... 463/31
  See application file for complete search history.

(56) References Cited

FOREIGN PATENT DOCUMENTS

| | | |
|---|---|---|
| JP | 2003062326 A | 3/2003 |
| JP | 2008093307 A | 4/2008 |
| JP | 2011065578 A | 3/2011 |

OTHER PUBLICATIONS

"Massive Action Game", PS3-yo Software, Sony Computer Entertainment Inc., Aug. 12, 2010, 4 pages.

"Bio Hazard 4 Kaitai Shinsho Revised Edition", 1st Edition, Studio Bent Stuff Co., Ltd., Capcom Co. Ltd., Jan. 26, 2006, 5 pages.

ISA Japanese Patent Office, International Search Report of PCT/JP2013/003348, WIPO, Jun. 21, 2013, 4 pages.

\* cited by examiner

COMPUTER DEVICE, STORAGE MEDIUM, AND METHOD OF CONTROLLING COMPUTER DEVICE

FIELD OF THE INVENTION

The present invention relates to a computer device, a storage medium, and a method of controlling the computer device which can implement a game in which a player character can act within a virtual game space by a user's operation.

BACKGROUND OF THE INVENTION

Conventionally, there is a game which advances according to a user's operation for causing a player character to act within a virtual game space. As an example of this, there is a gun shooting game in which the user operates the player character having a firearm such as a gun or a rifle. In this game, the user advances the game while beating an enemy character which the player character encounters by shooting. In this game, for example, while moving toward a destination within the virtual game space, the player character shoots the enemy character in a state in which the player character hides behind an object such as a building or a vehicle.

Patent Literature 1 discloses a technique relating to the gun shooting game. According to Patent Literature 1, for example, columnar shield objects are placed in a virtual game space displayed on a monitor. According to the user's operation, the player character selectively takes either a non-shooting stance (posture) in which the player character hides behind the shield object or a shooting stance in which its whole body is exposed outside the shield object. In the non-shooting stance, the player character can be perfectly defended against shooting by the enemy character, but cannot attack the enemy character. On the other hand, in the shooting stance, the player character can attack the enemy character, but is likely to be shot by the enemy character.

CITATION LIST

Patent Literature

Patent Literature 1: Japanese Laid-Open Patent Application Publication No. 2008-93307

SUMMARY OF THE INVENTION

However, in the conventional gun shooting game, as described above, the player character can selectively take only either the non-shooting stance or the shooting stance in an area which is near the shield object. This makes the player character's action (motion) simple. Therefore, the player character cannot act in various ways according to the user's intention.

Accordingly, an object of the present invention is to provide a computer device, a storage medium, and a method of controlling the computer device, which enable the player character to act in various ways according to the user's intention.

According to the present invention, there is provided a computer device comprising: a generating module which generates a virtual game space; and a control module which controls an action of a player character within the virtual game space corresponding to a user's operation; wherein the control module includes: a movement control module which causes the player character to move corresponding to the user's operation to a first operation unit; and a stance control module which changes a variation in the player character's stance changed from a reference stance corresponding to an amount of the user's operation to a second operation unit which is different from the first operation unit.

In accordance with the present invention, it becomes possible to provide a computer device, a storage medium, and a method of controlling the computer device, which enable the player character to act in various ways according to the user's intention.

DESCRIPTION OF EMBODIMENTS

Figure 1:
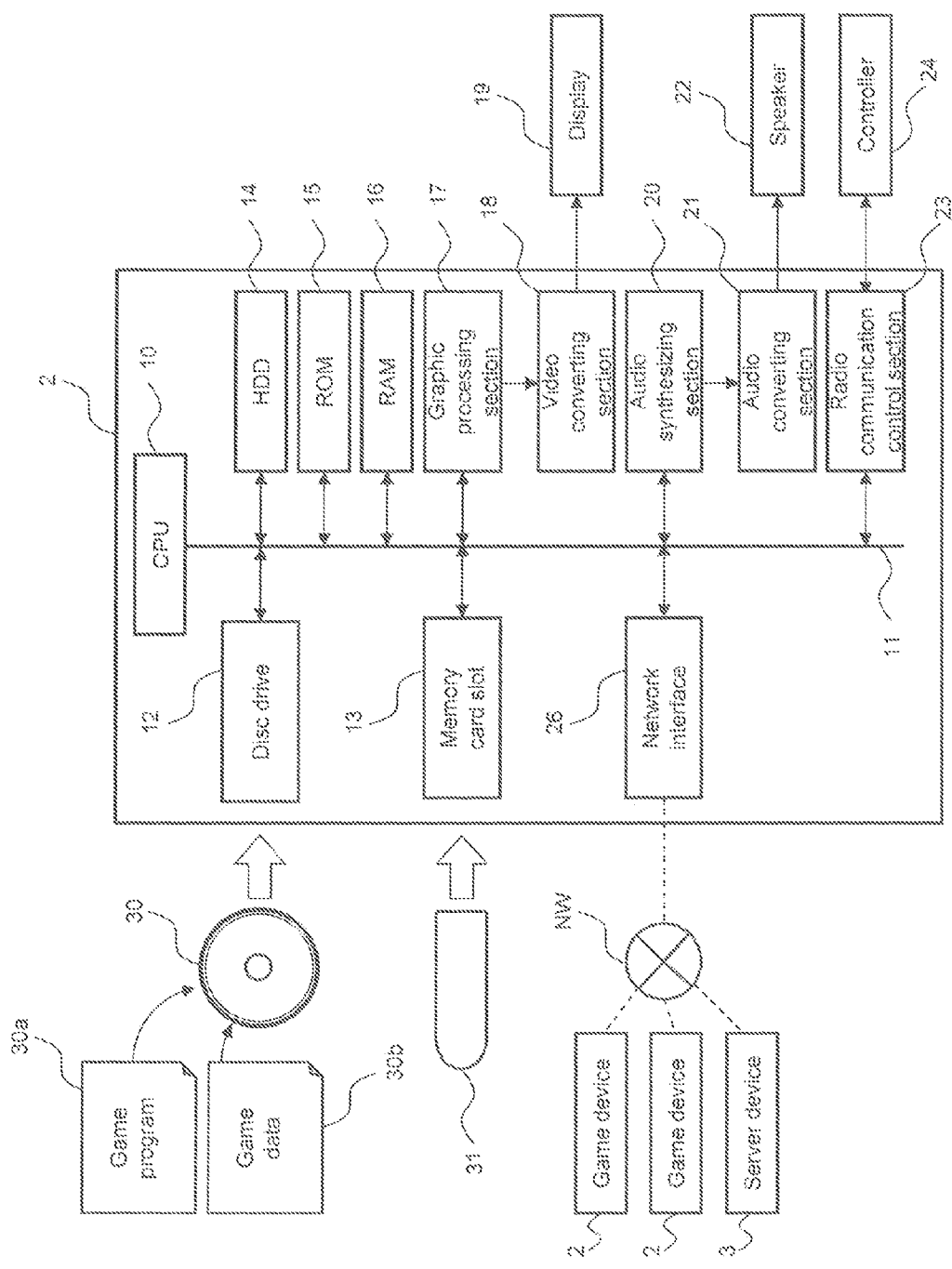
FIG. 1 is a block diagram showing the hardware configuration of a game device.

According to the present invention, there is provided a computer device comprising: a generating module which generates a virtual game space; and a control module which controls an action of a player character within the virtual game space corresponding to a user's operation; wherein the control module includes: a movement control module which causes the player character to move corresponding to the user's operation to a first operation unit; and a stance control module which changes a variation in the player character's stance changed from a reference stance corresponding to an amount of the user's operation to a second operation unit which is different from the first operation unit.

According to the present invention, there is provided a storage medium which is computer-device-readable, and contains commands executed by a control section of the computer device, the commands causing the computer device to execute steps of: generating a virtual game space; and controlling an action of a player character within the virtual game space corresponding to a user's operation; wherein the step of controlling the action of the player character includes: causing the computer device to move the player character corresponding to the user's operation to a first operation unit; and changing a variation in a player character's stance from a reference stance corresponding to an amount of the user's operation to a second operation unit which is different from the first operation unit.

According to the present invention, there is provided a method of controlling a computer device comprising steps of: generating a virtual game space; and controlling an action of a player character within the virtual game space corresponding to a user's operation; wherein the step of controlling the action of the player character includes: causing the computer device to move the player character corresponding to the user's operation to a first operation unit; and changing a variation in a player character's stance from a reference stance corresponding to an amount of the user's operation to a second operation unit which is different from the first operation unit.

In this configuration, the player character's stance can be displaced to a degree corresponding to the user's intention, corresponding to the operation amount of the second operation unit. In other words, the user can increase or decrease the variation in the player character's stance according to an increase or decrease in the operation amount of the second operation unit. Therefore, the action of the player character is not one action selected from only the two actions, but is performed in various ways. As the second operation unit, a volume switch may be typically used, but other operation means may be used. The means which changes variation may increase the variation in the player character's stance changed from the reference stance, according to the increase in the operation amount of the second operation unit, and decrease the variation in the player character's stance changed from the reference stance, according to the decrease in the operation amount of the second operation unit. However, the relationship between the operation amount of the second operation unit and the variation in the player character's stance changed from the reference stance is not limited to this, and other relationships may be used.

In the above computer device, the stance control module may change an amount of a player character's body area which is exposed from a shield object placed in the virtual game space corresponding to the amount of the user's operation to the second operation unit, when the player character is positioned behind the shield object.

In the above storage medium, the step of changing a variation may change an amount of a player character's body area which is exposed from a shield object placed in the virtual game space corresponding to the amount of the user's operation to the second operation unit, when the player character is positioned behind the shield object.

In the method of controlling the computer device, the step of changing a variation may change an amount of a player character's body area which is exposed from a shield object placed in the virtual game space corresponding to the amount of the user's operation to the second operation unit, when the player character is positioned behind the shield object.

In this configuration, when the user operates the second operation unit, for example, after the user operates the first operation unit and thereby the player character moves to a location behind the shield object, the amount of the player character's body area which is exposed with respect to the reference stance in which the player character is hiding behind the shield object is decided, corresponding to the operation amount of the second operation unit. For example, when the user increases the operation amount of the second operation unit, the amount of the player character's body area which is exposed with respect to the reference stance (amount of variation in the player character's stance changed from the reference stance) is increased. On the other hand, when the user decreases the operation amount of the second operation unit in this state, the amount of the player character's body area which is exposed with respect to the reference stance (amount of variation in the player character's stance changed from the reference stance) is decreased.

In the above computer device, the stance control module may change a variation in a player character's shooting stance corresponding to the amount of the user's operation to the second operation unit.

In the above storage medium, the step of changing the variation may change a variation in a player character's shooting stance corresponding to the amount of the user's operation to the second operation unit.

In the above method of controlling the computer device, the step of changing the variation may change a variation in a player character's shooting stance corresponding to the amount of the user's operation to the second operation unit.

In this configuration, it becomes possible to implement shooting in various stances, instead of only either the shooting stance or the non-shooting stance which is selected in a conventional example.

In the above computer device, the stance control module may change accuracy of a weapon used for shooting by the player character, in addition to the variation in the shooting stance corresponding to the amount of the user's operation to the second operation unit.

In the above storage medium, the step of changing the variation may change accuracy of a weapon used for shooting by the player character, in addition to the variation in the shooting stance corresponding to the amount of the user's operation to the second operation unit.

In the above method of controlling the computer device, the step of changing the variation may change accuracy of a weapon used for shooting by the player character, in addition to the variation in the shooting stance corresponding to the amount of the user's operation to the second operation unit.

In this configuration, the accuracy corresponding to the shooting stance can be automatically set, corresponding to the operation amount of the second operation unit. For example, in the case of the shooting stance in which only one hand of the player character is exposed from the shield object, the accuracy is set lower, whereas in the case of the shooting stance in which the player character's upper body area is exposed from the shield object and the user is holding the gun with both right and left hands, the accuracy is set higher. In this way, the accuracy corresponding to the player character's stance can be set.

In the above computer device, the stance control module may change a variation in a player character's stance of opening or closing a door corresponding to the amount of the user's operation to the second operation unit, and changes a degree of door opening and sound made when the player character opens or closes the door corresponding to the amount of the user's operation to the second operation unit. The sound made when the player character opens or closes the door may be, for example, sound volume or tone.

In the above storage device, the step of changing the variation may change a variation in a player character's stance of opening or closing a door corresponding to the amount of the user's operation to the second operation unit, and a degree of door opening and sound made when the player character opens or closes the door corresponding to the amount of the user's operation to the second operation unit.

In the above method of controlling the computer device, the step of changing the variation may change a variation in a player character's stance of opening or closing a door corresponding to the amount of the user's operation to the second operation unit, and a degree of door opening and sound made when the player character opens or closes the door corresponding to the amount of the user's operation to the second operation unit.

In the above computer device, the stance control module may blend data indicating a plurality of stances of the player character corresponding to the amount of the user's operation to the second operation unit, and obtains data indicating the player character's stance corresponding to the amount of the user's operation to the second operation unit.

In the above storage medium, the step of changing the variation may blend data indicating a plurality of stances of the player character corresponding to the amount of the user's operation to the second operation unit, and obtains data indicating the player character's stance corresponding to the amount of the user's operation to the second operation unit.

In the above method of controlling the computer device, the step of changing the variation may blend data indicating a plurality of stances of the player character corresponding to the amount of the user's operation to the second operation unit, and obtains data indicating the player character's stance corresponding to the amount of the user's operation to the second operation unit.

Hereinafter, the computer device, the storage medium and the method of controlling the computer device according to the embodiment of the present invention will be described with reference to the drawings. In the present embodiment, a gun shooting game will be exemplarily described, which advances (progresses) in such a manner that a player character is caused to act within a virtual game space, corresponding to a user's operation. For example, in the gun shooting game, shield objects are placed within the virtual game space, the player character moves toward a destination (target place) while shooting an enemy character in a state in which the player character is hiding behind or exposed from the shield objects.

Hardware Configuration

FIG. 1 is a block diagram showing the hardware configuration of a game device (computer device) 2. The game device 2 can communicate with other game devices 2 and a server device 3, via a communication network NW such as the Internet or a Local Area Network (LAN). The game device 2 includes a Central Processing Unit (CPU) 10 as a computer which controls its operation. A disc drive 12, a memory card slot 13, a Hard Disk Drive (HDD) 14 and a Read Only Memory (ROM) 15 which are a program storage means, and a Random Access Memory (RAM) 16, are connected to the CPU 10 via a bus 11.

The disc drive 12 can be loaded with a disc-type storage medium 30 such as a DVD-ROM. The disc-type storage medium 30 contains a game program 30a, and game data 30b required to advance the game, including data used to create characters, a virtual game space, etc., according to the present embodiment. The memory card slot 13 can be loaded with a card-type storage medium 31 which is able to store save data indicating a play state such as a state in the middle of advancing of the game, in response to a command from the CPU 10.

The HDD 14 is a high-capacity storage medium built into the game device 2. The HDD 14 is able to store the game program 30a and the game data 30b which are read in from the disc-type storage medium 30, the save data, etc. The ROM 15 is a semiconductor memory such as a mask ROM or a Programmable Read Only Memory (PROM). The ROM 15 contains basic programs such as a program for starting up the game device 2 and a program for controlling an operation performed when the disc-type storage medium 30 is loaded, etc. The RAM 16 is composed of a Dynamic Random Access Memory (DRAM), a Static Random Access Memory (SRAM), etc. The RAM 16 reads in the game program 30a to be executed by the CPU 10, the game data 30b required in the execution of the game program 30a, etc., from the disc-type storage medium 30 or the HDD 14, according to the play state of the game, and temporarily stores them.

The CPU 10 is further connected to a graphic processing section 17, an audio synthesizing section 20, a radio (wireless) communication control section 23, and a network interface 26 via the bus 11.

The graphic processing section 17 draws a game image including the virtual game space, the characters, etc., in response to the command from the CPU 10. The graphic processing section 17 is connected to an outside display (output section) 19 via a video converting section 18. The video converting section 18 converts the game image drawn by the graphic processing section 17 into a motion picture format, which is displayed on the display 19.

The audio synthesizing section 20 reproduces and synthesizes a digital game sound in response to the command from the CPU 10. An outside speaker 22 is connected to the audio synthesizing section 20 via an audio converting section 21. Therefore, the audio converting section 21 decodes the game sound reproduced and synthesized by the audio synthesizing section 20 into an analog format and then the speaker 22 outputs the game sound in the analog format to outside.

The radio communication control section 23 has a radio communication module of a 2.4 GHz band which is connected via radio (wirelessly) to a controller 24 associated with the game device 2 and is able to transmit/receive data to/from the controller 24. The user operates operation units 25 (see FIG. 2) such as a button provided on the controller 24 to input a signal to the game device 2, thereby controlling the action of the player character displayed on the display 19.

Figure 2:
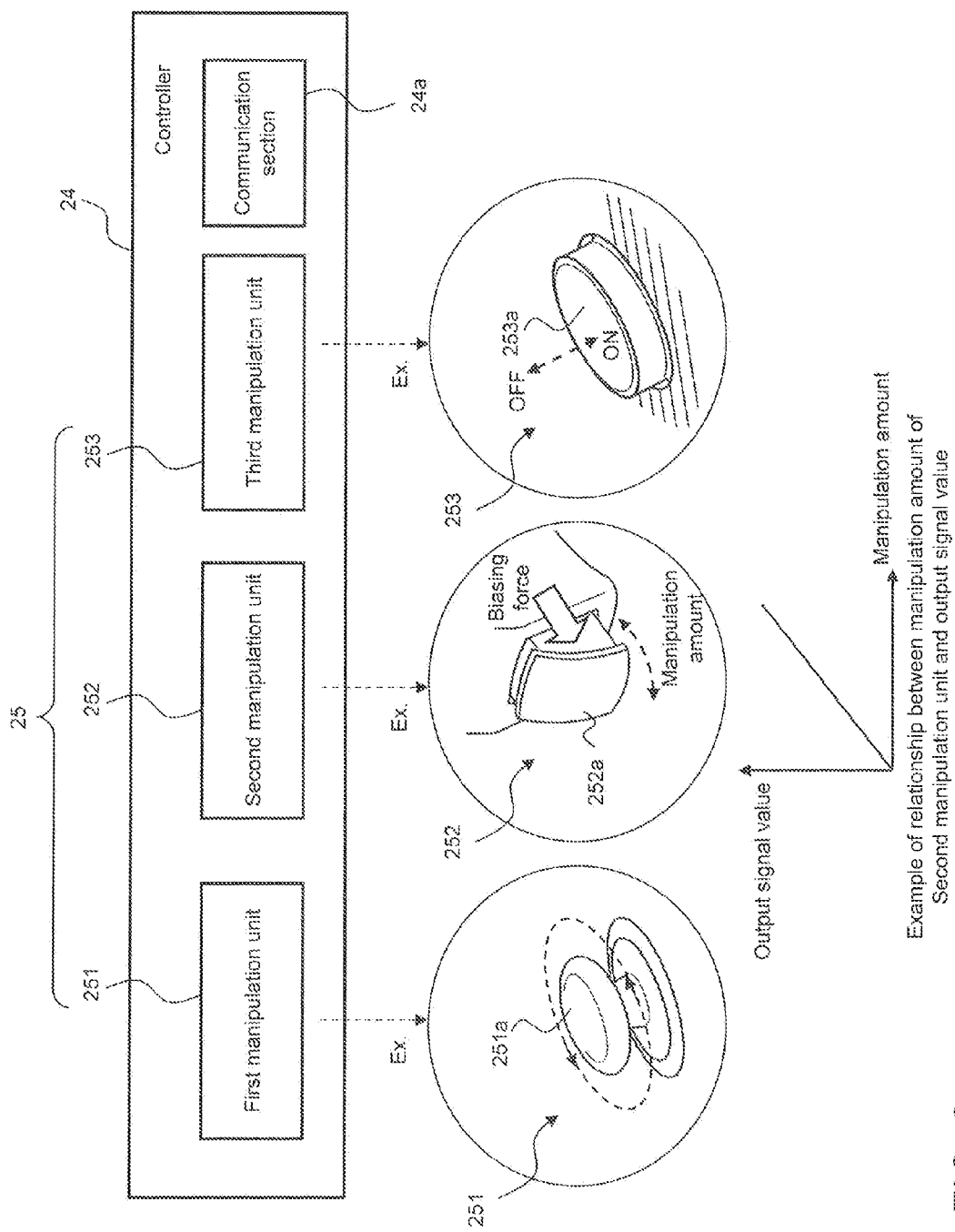
FIG. 2 is a view showing the configuration of a controller.

FIG. 2 is a view showing the configuration of the controller 24. The controller 24 includes a plurality of operation units 25 (251 to 253) in addition to a communication section 24a which communicates with the above described radio communication control section 23. Specifically, the operation units 25 includes the stick-type first operation unit 251, the volume-switch-type second operation unit 252, and the ON/OFF-type third operation unit 253.

The stick-type first operation unit 251 includes a stick-type operation member 251a which is operated by, for example, a user's thumb. The operation member 251a can be tilted and rotated in all directions by 360 degrees around a reference position in which the operation member 251a is upright. When the user tilts the first operation unit 251, for example, the player character moves or the orientation of a virtual camera which takes an image of the virtual game space is changed, according to the direction in which the first operation unit 251 is tilted.

The volume-switch-type second operation unit 252 has a one-to-one correspondence between the amount of the user's operation and its output signal value (e.g., voltage value or frequency). Typically, as shown in the graph of FIG. 2, the operation amount of the second operation unit 252 and the output signal value are proportional. Therefore, the CPU 10 can uniquely obtain the amount of user's operation of the second operation unit 252, based on the output signal from the second operation unit 252. When the user operates the second operation unit 252, the variation in the player character's stance is changed, corresponding to the operation amount (detail will be described later).

As a specific example of the second operation unit 252, as shown in FIG. 2, an operation member 252a which is biased in a protruding direction by an elastic body or the like may be used. In this configuration, the protruding operation member 252a (in non-operation position) can be pushed in to a predetermined position (maximum operation position) by, for example, the user's index finger. Or, when the pushing force applied by the index finger is mitigated, the operation member 252a is returned to its initial position by a biasing force. In a desired position between the non-operation position and the maximum operation position, the second operation unit 252 outputs a signal value corresponding to the variation in (operation amount of) the operation member 252a from the non-operation position.

The ON/OFF-type third operation unit 253 includes a button operation member 253a operated by, for example, the user's thumb. The third operation unit 253 outputs an ON-signal in response to the user's operation, and an OFF-signal when it is not operated by the user (or does not output the ON-signal). The third operation unit 253 is used to, for example, decide setting items on a configuration screen, execute particular actions of the player character, etc.

The number of each of the operation units 251 to 253 is not limited to one, but may be plural. The above described configurations of the operation units 251 to 253 are merely exemplary, and are not limited to the above. Other suitable configurations may be employed.

Turning back to FIG. 1, the network interface 26 connects the game device 2 to the communication network NW such as the Internet or LAN. Therefore, a particular game device 2 can communicate with other game devices 2 or a server device 3 via the communication network NW. In a case where the game device 2 is connected to other game devices 2 via the communication network NW, and data is mutually transmitted and received between them, a plurality of player characters can be displayed synchronously within the same game space. This enables a plurality of users to perform multi-play such that the users cooperate with each other to advance the game.

Figure 3:
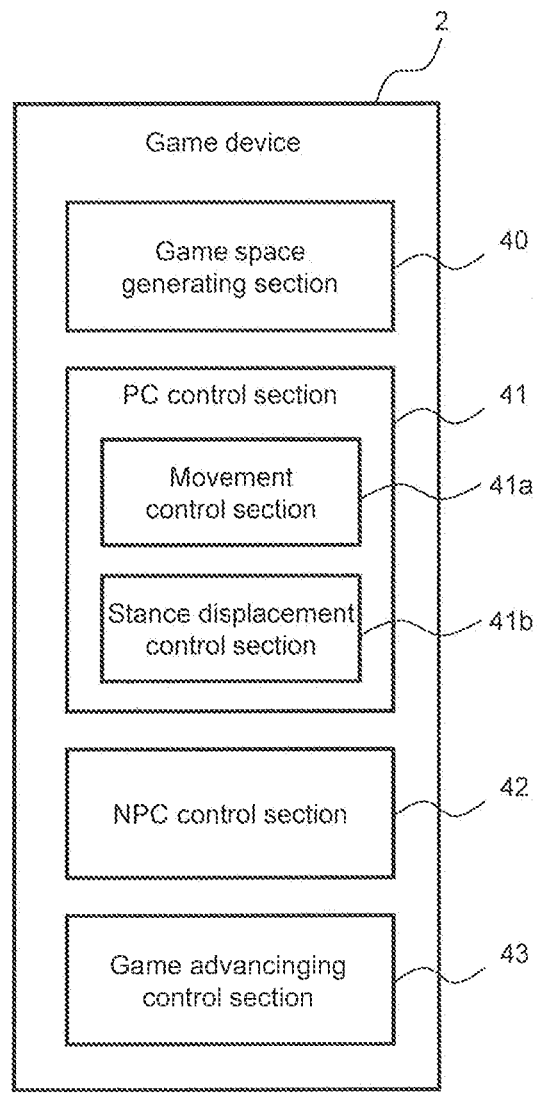
FIG. 3 is a block diagram showing the functional configuration of the game device.

FIG. 3 is a block diagram showing the functional configuration of the above described game device 2. The game device 2 executes the game program of the present invention to function as a game space generating section (virtual space generating means, virtual space generating module) 40, a PC control section (character action control means, character action control module) 41, an NPC control section (non-player character control means, non-player character control module) 42, and a game advancing control section (game advancing control means, game advancing control module) 43. These functions are performed as hardware by, for example, the CPU 10, the HDD 14, the ROM 15, the RAM 16, the graphic processing section 17, and the video converting section 18, which are shown in FIG. 1.

The game space generating section 40 generates the virtual game space (executes step of generating the game space), which is a stage in which the player character acts, and displays the virtual game space on the display 19. For example, according to the movement of the player character, and based on data such as the object and texture included in the game data 30b, the game space generating section 40 generates the three-dimensional virtual game space. In this virtual game space, there are placed shield objects behind which the player character hides so that the player character is invisible from the enemy character, such as a building or a drum can. Then, the game space generating section 40 generates the two-dimensional image of the generated game space which is taken by a particular virtual camera, and this image is displayed on the display 19. The game device 2 generates 30 frames of the two-dimensional image per second, and sequentially displays the image on the display 19.

The PC control section 41 includes a movement control section (movement control means, movement control module) 41a, and a stance control section (stance control means, stance control module) 41b. The PC control section 41 generates the player character (PC). The PC control section 41 controls the action of the player character (executes step of controlling the action of the character) within the virtual game space, corresponding to the user's operation of the controller 24, or the advancing state of the game. For example, when the user operates the first operation unit 251, the movement control section 41a moves the player character within the virtual game space (executes step of controlling the movement). Or, when the user operates the second operation unit 252, in a state in which the player character is hiding behind the shield object, the stance control section 41b exposes a part of the player character's body area from the shield object and causes the player character to take a shooting stance against the enemy character (hereinafter will be referred to as shooting stance) (executes step of changing the variation). When the user operates, for example, the third operation unit 253 in a state in which the player character is in the shooting stance, the player character can perform shooting in this stance.

In addition to the above, the PC control section 41 manages the status of the player character and controls the action of the player character according to the status. For example, an initial vitality value is set for the player character, and the PC control section 41 updates the present vitality value of the player character to a vitality value obtained by subtracting a damage value from the present vitality value when the enemy character attacks the player character. When the vitality value becomes a predetermined value or less, the PC control section 41 disenables the player character to act.

The NPC control section 42 generates the enemy character which is the non-player character (NPC) and controls the action of the enemy character in the virtual game space. For example, to find the player character, the NPC control section 42 seeks the player character within the virtual game space, according to a predetermined rule. When the player character approaches the enemy character within a specified distance, the NPC control section 42 causes the enemy character to attack the player character, for example, by shooting the player character. The NPC control section 42 manages the status of the enemy character. For example, an initial vitality value is set in the enemy character, and when the vitality value of the enemy character becomes a predetermined value or less, due to attack on the enemy character by the player character, the NPC control section 42 disenables the enemy character to act.

The game advancing control section 43 controls the advancing of the game in response to the user's operation, with a passage of a game time, etc. For example, in a case where the player character performs a specified action in response to the user's operation, the game advancing control section 43 generates a specified event and reproduces a specified motion picture for a specified time. In addition, the game advancing control section 43 changes the environment within the virtual game space with a passage of the game time. Furthermore, the game advancing control section 43 causes the enemy character to appear in locations of the virtual game space depending on the locations and the like of the player character.

Next, the action control of the player character in response to the user's operation of the controller 24 will be described.

Figure 4:
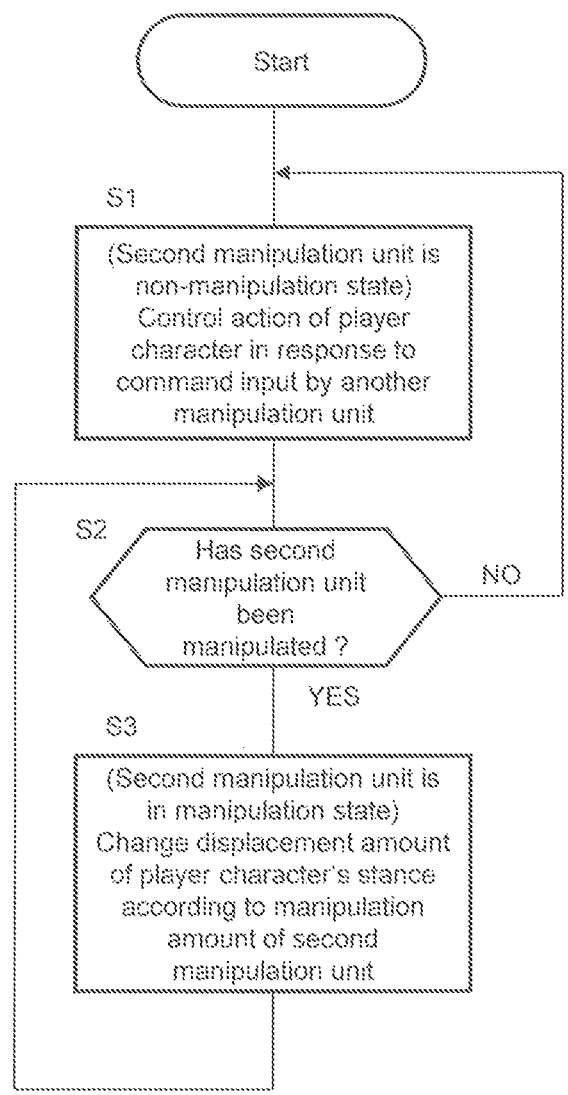
FIG. 4 is a flowchart showing the action control of a player character.

FIG. 4 is a flowchart showing the action control of the player character. Referring to FIG. 4, in step S1 (step of controlling the movement), the user is not operating the second operation unit 252 (operation member 252a is in the non-operation position) and the action of the player character located in the virtual game space is controlled in response to a command input by another operation unit 25. For example, when the user operates the first operation unit 251, the movement control section 41a moves the player character in response to the operation.

Then, when the user operates the second operation unit 252 in this state (step S2: YES), the stance control section 41b of the PC control section 41 displaces the player character's stance by a variation corresponding to the operation amount (step S3: step of changing the variation). Specifically, the stance control section 41b varies the shooting stance of the player character holding the gun. This variation will be described more specifically below. The player character's stance just before the second operation unit 252 is operated is a "reference stance." Corresponding to the operation amount of the second operation unit 252, variation in the player character's stance changed from the reference stance is changed. When the operation of the second operation unit 252 is finished (e.g., operation amount becomes zero), the player character is returned to the reference stance.

Hereinafter, how the variation in the player character's stance is changed, corresponding to the operation amount of the second operation unit 252 (specific example of step S3) (step of changing the variation) will be exemplarily described.

Operation Example 1

Figure 5:
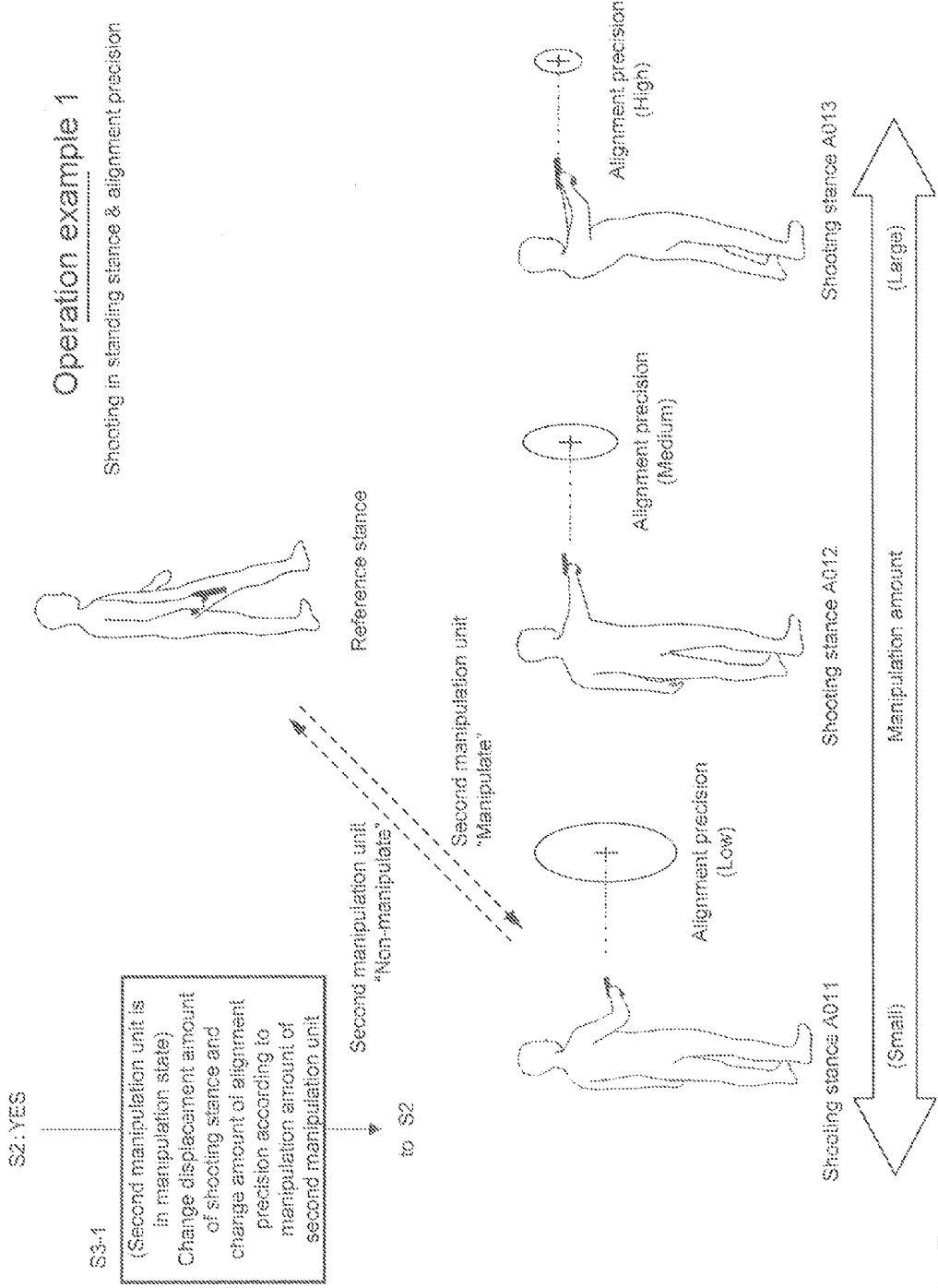
FIG. 5 is a view showing operation example 1 of the player character.

FIG. 5 is a view showing operation example 1 of the player character. In the case of the operation example 1, the player character is positioned in an open field in the virtual game space. Corresponding to the amount of user's operation of the second operation unit 252, the player character's stance of holding the gun is displaced, and thereby the accuracy is changed (step S3-1).

This will be specifically described. In the case of the operation example 1, as shown in FIG. 5, the state in which the player character is walking in the field is one aspect of the "reference stance" of the player character. In this state, when the user operates the second operation unit 252, and the operation amount of the second operation unit 252 (operation member 252a) is small, only a portion of the right arm holding the gun, from its elbow to its tip end, is directed forward (shooting stance A011). At this time, the accuracy is set relatively low. When the operation amount of the second operation unit 252 is increased up to about a median value in an operation range, the whole right arm holding the gun is stretched straight forward (shooting stance A012). In a range from the shooting stance A011 to the shooting stance A012, the accuracy becomes higher as the operation amount of the second operation unit 252 is increased. In the shooting stance A012, the accuracy is set to about a medium value. When the operation amount of the second operation unit 252 is further increased to a maximum operation amount, the whole body is directed forward, and the right and left arms holding the gun are stretched straight forward (shooting stance A013). In a range from the shooting stance A012 to the shooting stance A013, the accuracy becomes higher as the operation amount of the second operation unit 252 is increased, and becomes highest in the shooting stance A012.

The shooting in the shooting stance A011 can be utilized as, for example, a warning shot, although the probability with which the enemy character is shot is low. In contrast, as the operation amount of the second operation unit 252 is increased, the probability with which the enemy character is shot becomes higher. Therefore, the shooting in the shooting stance A013 can be utilized as, for example, precision shooting.

As described above, in the case of the operation example 1, the variation in the player character's stance (shooting stance), and the change amount of the accuracy are changed, corresponding to the operation amount of the second operation unit 252. For example, in the shooting stance A011 in which the player character is holding the gun in an easy manner, the accuracy is set relatively lower, whereas in the shooting stance A013 in which the player character is holding the gun in a precise manner, the accuracy is set relatively higher. In this way, the accuracy is set so as to correspond to the player character's stance. This does not make the user feel discomfort. Moreover, as shown in FIG. 5, the indication of the accuracy is displayed on the display 19 so that the user can easily operate the second operation unit 252. In the example of FIG. 5, as the indication of the accuracy, circles which are decreased in its dimension as the accuracy becomes higher, are illustrated. A virtual line connecting the gun held by the player character to a target to be shot passes through a center of each circle.

The above described variation from the shooting stance A011 to the shooting stance A013 can be implemented by an animation or blend technique (the same applies to other operation examples described below). For example, in the case of the animation, a series of animations from the shooting stance A011 to the shooting stance A013 is created in advance, and a correspondence between the operation amount of the second operation unit 252 and reproduced part of the animation is preset. When the user operates the second operation unit 252, an animation part corresponding to the operation amount is reproduced. In the case of the blend technique, coordinate data of the player character's body parts, angular data of the player character's joints, etc., in the shooting stance A011 and the shooting stance A013 (one or a plurality of stances between the shooting stance A011 and the shooting stance A013, if necessary), are pre-stored as reference values. When the user operates the second operation unit 252, required reference values are suitably blended, corresponding to the operation amount of the second operation unit 252, and the coordinate data and angular data associated with the shooting stance corresponding to the operation amount are calculated (obtained). Based on the calculated data, the player character which takes a shooting stance corresponding to the operation amount is generated.

Although FIG. 5 shows three examples (the shooting stance A011 to the shooting stance A013) corresponding to the operation amount of the second operation unit 252, the shooting stance can be changed substantially steplessly, corresponding to the operation amount of the second operation unit 252. However, instead of steplessly, the shooting stance may be changed in multiple steps. In any shooting stance, when the user operates a button to perform shooting, the player character shoots the enemy character in the shooting stance.

Furthermore, the change amount of the accuracy can be changed substantially steplessly, or in multiple steps, corresponding to the operation amount of the second operation unit 252, in addition to the above three examples. The accuracy may be changed in such a way that the magnitude of unsteadiness of the hand in the shooting (degree of effect of reaction of the shooting), visibility of the virtual game space (e.g., degree of blurring of the game image), etc. may be changed.

Although in the above described example, the user increases the operation amount of the second operation unit 252, the stance is displaced in a reversed manner when the user decreases the operation amount of the second operation unit 252. Therefore, when the user increases or decreases the operation amount of the second operation unit 252 (e.g., the user pushes in or releases the operation member 252a of FIG. 2), the player character takes a stance corresponding to the operation amount, between the shooting stance A011 and the shooting stance A013. When the user finishes the operation of the second operation unit 252 (i.e., operation amount becomes zero), the player character is returned to the reference stance.

Although in the operation example 1, the stance control section 41b displaces the shooting stance of the player character, corresponding to the operation amount, and correspondingly changes the accuracy, the present invention is not limited to this. For example, in the operation example 1, only the shooting stance may be displaced, corresponding to the operation amount, but the accuracy may not be changed in spite of the operation amount. Or, in a case where the accuracy is changed, the position (viewpoint) of the virtual camera may be changed according to this change. For example, in a case where the amount of the user's operation of the second operation unit 252 is small, the game image is defined such that the viewpoint is set in a position behind and away from the player character. With an increase in the operation amount, the viewpoint is made close to the player character. At a time point when the operation amount reaches a maximum operation amount, the viewpoint is caused to coincide with that of the player character (first-person viewpoint).

Operation Example 2

Figure 6:
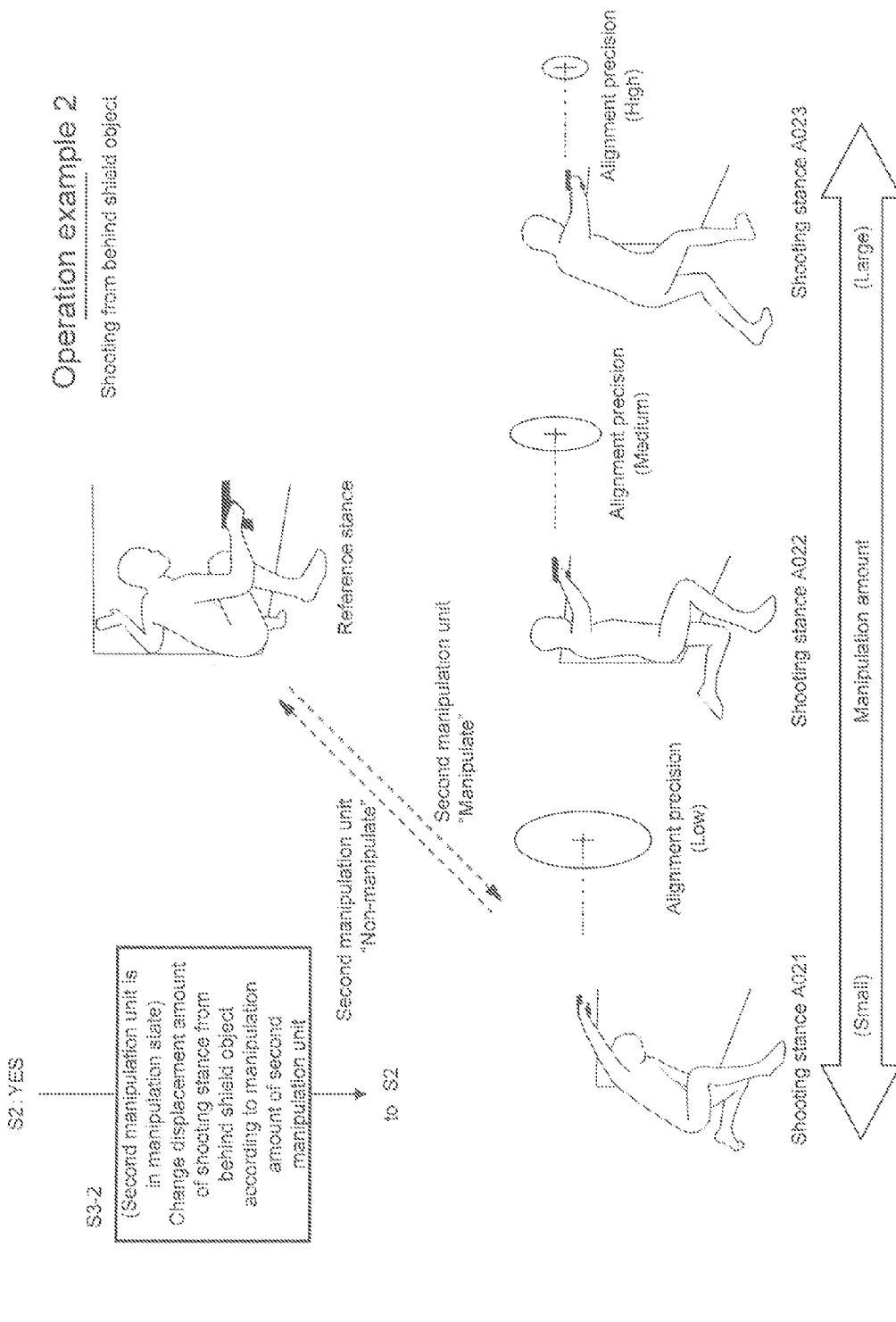
FIG. 6 is a view showing operation example 2 of the player character.

FIG. 6 is a view showing operation example 2 of the player character. In the case of the operation example 2, the variation in the shooting stance of the player character is changed, corresponding to the operation amount of the second operation unit 252, in a state in which the player character is hiding behind the shield object.

This will be specifically described. In the present game, the player character moves in response to the operation of the first operation unit 251. When the player character enters a predetermined range from the shield object, the player character automatically hides behind the shield object. In the operation example 2, the state in which the player character is hiding behind the shield object is the "reference stance." In this state, while the user is not operating the second operation unit 252, the PC control section 41 controls the action of the player character in response to a command input by another operation unit 25 (see step S1 of FIG. 4).

Then, when the user operates the second operation unit 252 in the above state (step S2 of FIG. 4: YES), the stance control section 41b of the PC control section 41 changes the variation in the player character's stance changed from the reference stance by the variation corresponding to the operation amount (step S3 of FIG. 4). Specifically, the stance control section 41b changes the variation in the shooting stance of the player character holding the gun, and correspondingly changes the amount of body area that is exposed from the shield object (see step S3-2 of FIG. 6).

For example, in a case where the amount of the user's operation of the second operation unit 252 (operation member 252a) is small, only the right arm holding the gun is exposed from the shield object and directed forward (shooting stance A021). When the operation amount of the second operation unit 252 is increased up to about the median value in the operation range, the head part of the player character is exposed from the shield object, and the player character holds the gun with one arm while watching the enemy character (shooting stance A022). When the operation amount of the second operation unit 252 is further increased up to the maximum operation amount, a large part of the upper body area of the player character is exposed from the shield object, and the player character firmly holds the gun with both right and left arms while watching the enemy character (shooting stance A023). When the amount of the user's operation of the second operation unit 252 becomes zero, the player character is returned to the reference stance.

Therefore, the shooting in the shooting stance A021 in which the player character performs shooting while hiding behind the shield object can be utilized as, for example, shooting warning shot in a relatively safe state, although the probability with which the enemy character is shot is low. In contrast, as the operation amount of the second operation unit 252 is increased, the amount of the body area which is exposed from the shield object is increased, and the player character is more likely to be attacked by the enemy character, but the probability with which the enemy character is shot can be made higher.

In the operation example 2, also, the variation in the shooting stance of the player character can be changed steplessly, or in multiple steps, in addition to the above described shooting stances A021 to A023. In addition, as shown in FIG. 6, as in the case of the operation example 1, the accuracy can be changed along with the variation in the shooting stance, or the indication of the accuracy can be displayed on the display 19. Although in the above described example, the player character automatically hides behind the shield object when the player character enters the predetermined range from the shield object, the present invention is not limited to this. For example, in a case where the player character enters the predetermined range from the shield object, and the user performs a specified operation, the player character may automatically hide behind the shield object.

Although in the above operation example 2, the reference stance in which the player character is made invisible from the enemy character is the reference stance in which the player character hides behind the shield object, the present invention is not limited to this. For example, the variation in the shooting stance of the player character may be changed, corresponding to the operation amount of the second operation unit 252, in a state in which the player character is hiding under water.

In this case, the state in which the player character is hiding under water is the "reference stance," and the variation in the shooting stance of the player character is changed by the variation corresponding to the operation amount of the second operation unit 252, from the reference stance. For example, in a case where the amount of the user's operation of the second operation unit 252 is small, the player character holds the gun with the right arm such that the right arm is exposed above a water surface in a state in which almost all of the body is under water. When the operation amount of the second operation unit 252 is increased up to about the median value in the operation range, the head part of the player character is exposed above the water surface, and the player character holds the gun with one arm while watching the enemy character. When the operation amount of the second operation unit 252 is further increased up to the maximum operation amount, a large part of the upper body area of the player character is exposed above the water surface, and the player character firmly holds the gun with the right and left arms. When the amount of the user's operation of the second operation unit 252 becomes zero, the player character is returned to the reference stance.

Therefore, the shooting in the shooting stance corresponding to the small operation amount of the second operation unit 252, in which the body part of the player character is hiding under water, can be utilized as, for example, shooting in a relatively safe state, although the probability with which the enemy character is shot is low. In contrast, as the operation amount of the second operation unit 252 is increased, the amount of the body area which is exposed above the water surface is increased, and the player character is more likely to be attacked by the enemy character, but the probability with which the enemy character is shot can be made higher. In the operation example 2, as in the case of the operation example 1, only the shooting stance may be displaced, corresponding to the operation amount, but the accuracy may not be changed in spite of the operation amount.

Operation Example 3

Figure 7:
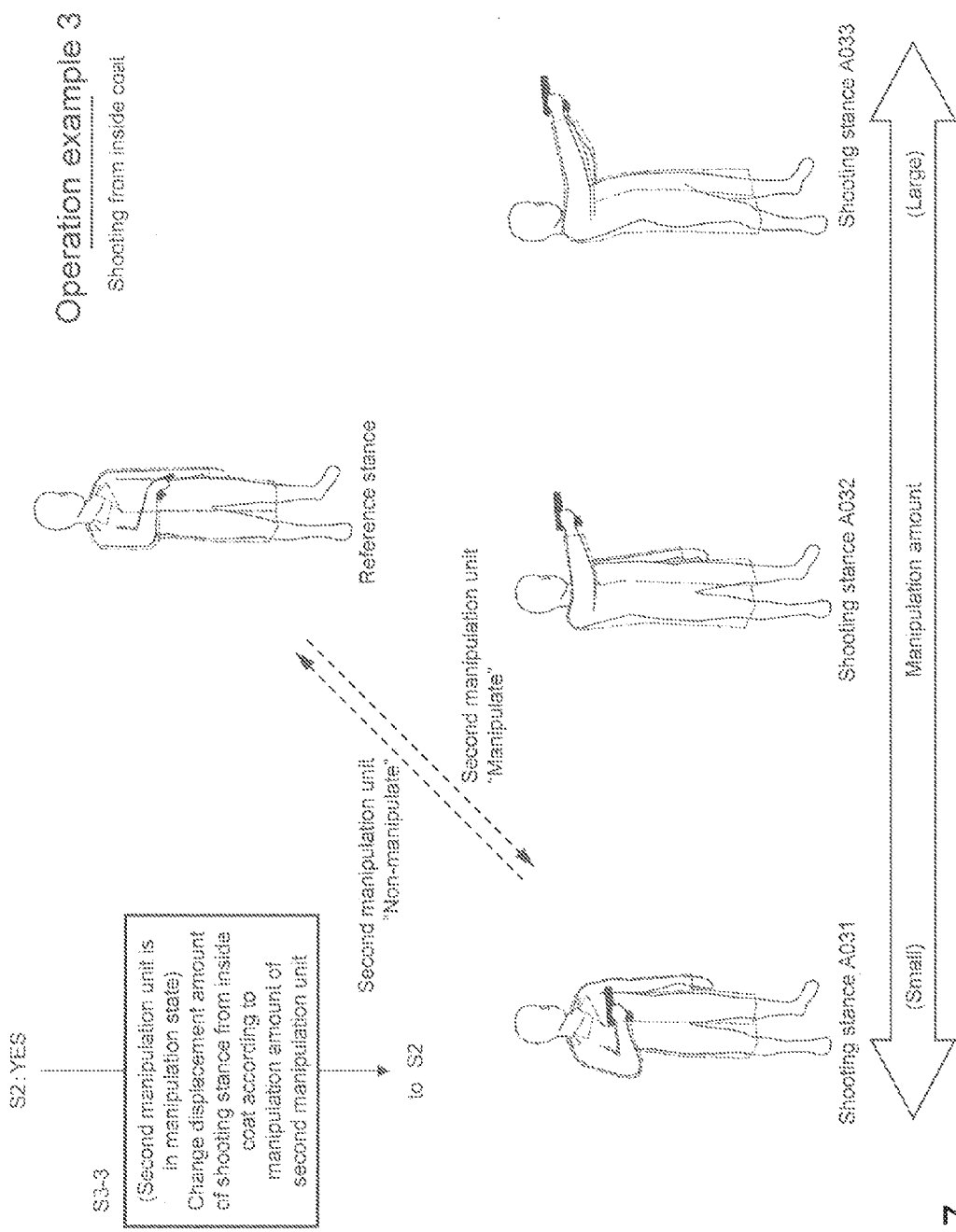
FIG. 7 is a view showing operation example 3 of the player character.

FIG. 7 is a view showing operation example 3 of the player character. In the case of the operation example 3, the variation in the shooting stance of the player character is changed, corresponding to the operation amount of the second operation unit 252, in a state in which the player character is holding the gun inside outerwear such as a coat.

This will be specifically described. In the operation example 3, the player character is holding the gun with the right arm inside the coat, and this state is the "reference stance." In FIG. 7, the coat is indicated by a one-dotted line. When the user operates the second operation unit 252 in this state (step S2 of FIG. 4: YES), the stance control section 41*b* of the PC control section 41 changes the variation in the player character's stance changed from the reference stance by the variation corresponding to the operation amount (step S3 of FIG. 4). Specifically, the stance control section 41*b* changes the variation in the shooting stance of the player character holding the gun, and correspondingly changes the amount of the portion of the gun which is exposed outside the coat (step S3-3 of FIG. 7).

For example, in a case where the amount of the user's operation of the second operation unit 252 (operation member 252*a*) is small, the player character holds the gun in a state in which the gun is held inside the coat (shooting stance A031). When the operation amount of the second operation unit 252 is increased up to about the median value in the operation range, the player character takes the gun out of the coat, and holds the gun with one arm in a position that is near the player character's body (shooting stance A032). When the operation amount of the second operation unit 252 is further increased up to the maximum operation amount, the whole body is directed forward, and the right and left arms holding the gun are stretched straight forward (shooting stance A033). When the amount of the user's operation of the second operation unit 252 becomes zero, the player character is returned to the reference stance.

Therefore, the shooting in the shooting stance A031 in which the gun is held inside the coat, can be utilized as, for example, shooting which is less likely to be noticed by the surroundings, or shooting over a short distance, although the probability with which the enemy character is shot is low. In contrast, as the operation amount of the second operation unit 252 is increased, the gun is exposed, but the probability with which the enemy character is shot can be made higher. When the user operates the second operation unit 252 with a large amount in a short time, and returns the operation amount to zero immediately thereafter, the series of actions can be performed quickly, in which the player character takes the gun out of the coat, shoots the enemy character in a stance with a high accuracy, and hides the gun inside the coat immediately thereafter.

In the operation example 3, as in the case of the operation examples 1 and 2, the indication of the accuracy may be displayed on the game image, although this is not shown in FIG. 7. In addition, only the shooting stance may be displaced, corresponding to the operation amount, but the accuracy may not be changed in spite of the operation amount.

Operation Example 4

Figure 8:
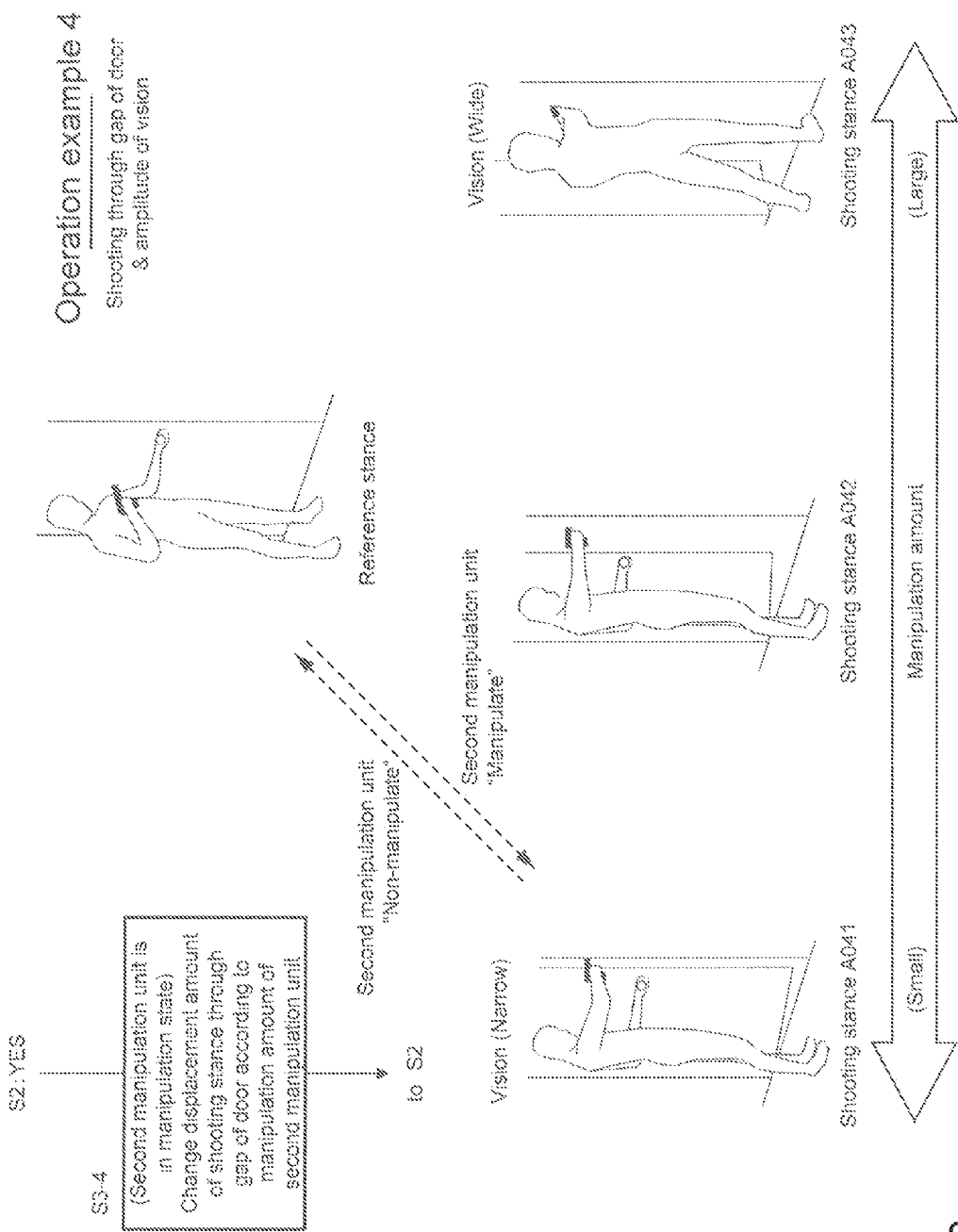
FIG. 8 is a view showing operation example 4 of the player character.

FIG. 8 is a view showing operation example 4 of the player character. In the case of the operation example 4, the player character opens a door, corresponding to the operation amount of the second operation unit 252 in a state in which the player character's body is close to the door. Corresponding to the operation amount of the second operation unit 252, the variation in the shooting stance (or stance of opening or closing the door), and amplitude of the player character's vision of an area outside the door, are changed.

This will be specifically described. In the operation example 4, the player character is close to the closed door, and this state is the "reference stance." When the user operates the second operation unit 252 in this state (step S2 of FIG. 4: YES), the stance control section 41*b* of the PC control section 41 changes the variation in the player character's stance changed from the reference stance by the variation corresponding to the operation amount (step S3 of FIG. 4). Specifically, the degree of door opening by the player character is changed, the variation in the shooting stance in which the player character holds the gun is changed, and the amplitude of the player character's vision of the area outside the door, is changed (step S3-4 of FIG. 8).

For example, in a case where the amount of the user's operation of the second operation unit 252 (operation member 252*a*) is small, the player character opens the door a little, grasps a door knob with the left hand, and holds the gun with only the right arm in a gap of the door while watching the enemy character through the gap (shooting stance A041). At this time, the vision of the area outside the door is narrow. When the operation amount of the second operation unit 252 is increased up to about the median value in the operation range, the player character opens the door to a medium degree and holds the gun while stretching the right arm forward (shooting stance A042). At this time, the vision of the area outside the door is about a medium degree. When the operation amount of the second operation unit 252 is further increased up to the maximum operation amount, the player character fully closes the door, and holds the gun with both the right and left arms (shooting stance A043). At this time, the player character's vision outside the door is widest. When the amount of the user's operation of the second operation unit 252 becomes zero, the player character is returned to the reference stance.

Therefore, the shooting in the shooting stance A041 in which the player character is hiding behind the door can be utilized as, for example, shooting in a relatively safe state, although the probability with which the enemy character is shot is low. In contrast, as the operation amount of the second operation unit 252 is increased, the amount of the player character's body area which is exposed outside the door is increased and the player character is more likely to be attacked by the enemy character, but the probability with which the enemy character is shot can be made higher. In the operation example 4, the indication of the accuracy may be displayed on the game image. In the operation example 4, also, only the stance of opening or closing the door may be displaced, corresponding to the operation amount, but the accuracy may not be changed in spite of the operation amount.

Although in the above described example, the degree of door opening, the shooting stance of the player character (and stance of opening or closing the door), and the amplitude of the player character's vision of the area outside the door, are all changed, corresponding to the operation amount of the second operation unit 252, the present invention is not limited to this. For example, the player character's stance of opening or closing the door may be changed, corresponding to the operation amount of the second operation unit 252, and correspondingly, the degree of door opening and the amplitude of the player character's vision of the area outside the door may be changed, corresponding to the operation amount, but the shooting stance of the player character may not be changed.

Alternatively, the configuration of the game image may be changed between a case where the degree of door opening is less than a predetermine value and a case where the degree of door opening is the predetermine value or more. For example, the game image may be configured in a third-person viewpoint when the degree of door opening is less than the predetermine value, while the game image may be configured in a first-person viewpoint (player character's viewpoint) when the degree of door opening is the predetermine value or more. Or, according to the change rate of the operation amount of the second operation unit 252, the speed at which the door is opened (change rate of the degree of door opening), and a sound made by opening or closing the door (e.g., volume or tone of the sound made by opening or closing the door), may be changed. For example, as the speed at which the door is opened becomes higher, the volume of the sound may be made higher. Therefore, if the user operates the second operation unit 252 slowly, the door can be opened quietly. Or, as the speed at which the door is opened becomes higher, the tone of the sound may be made higher. The door may be a sliding door, instead of a hinged door.

Operation Example 5

In addition to the above examples, depending on the amount of user's operation of the second operation unit 252, the variation in the stance relating to other action of the player character may be changed. For example, when the player character is positioned in the vicinity of the shield object, the variation in the player character's stance which moves over this shield object may be changed, corresponding to the operation amount of the second operation unit 252.

This will be specifically described. The player character is standing near the shield object (e.g., container), and this state is the "reference stance." When the user operates the second operation unit 252 in this state, the position (height position) of the player character with respect to the shield object is changed by the variation corresponding to the operation amount, and the variation in the player character's stance moving over the shield object, from the reference stance, is also changed. For example, in a case where the amount of the user's operation of the second operation unit 252 is small, both the right and left hands are put on the upper portion of the shield object. When the operation amount of the second operation unit 252 is increased up to about the median value in the operation range, the player character moves such that the upper body is positioned on the upper portion of the shield object. When the operation amount of the second operation unit 252 is further increased up to the maximum operation amount, the whole body of the player character moves over the upper portion of the shield object, and the player character lies down thereon and watches the surroundings. When the amount of the user's operation of the second operation unit 252 becomes zero, the player character moves down from the shield object and is returned to the reference stance.

The performance of the articles owned by the player character may be changed, corresponding to the operation amount of the second operation unit 252. For example, in a case where the player character owns a small gun, its rapid fire speed is changed, corresponding to the operation amount of the second operation unit 252. In this case, the rapid fire speed is increased as the operation amount is increased, and decreased as the operation amount is decreased. In a case where the player character owns a shotgun, the scattering range of bullets shot by the player character is changed, corresponding to the operation amount of the second operation unit 252. In this case, the scattering range is expanded as the operation amount is increased and diminished as the operation amount is decreased.

Although in the above described examples, only the operation amount of the second operation unit 252 (i.e., variation relating to tilting of the operation member 252a) has been mentioned, time for which the second operation unit 252 continues to be operated may be used instead of the operation amount. Although in the above described examples, the variation in the stance is increased with an increase in the operation amount and decreased with a decrease in the operation amount, the variation in the stance may be increased with an increase in the operation amount and may not be decreased in spite of a decrease in the operation amount.

Moreover, the "second operation unit" of the present invention is not limited to the operation unit as a physical object in the above described embodiments. For example, there is known a system called KINECT (registered mark), in which a game advances based on the user's motion which is detected by a camera or the like. In this system, the variation in the player character's stance may be changed, corresponding to the amount of operation to the means which detects the motion of the user (i.e., the second operation unit of the present invention).

The present invention is applicable to a game program and a game system which can implement a game that enables a player character to act in a virtual game space by a user's operation.

REFERENCE CHARACTER LIST 2 game device (game system)
10 CPU
24 controller
30a game program 30b game data
40 game space generating section (virtual space generating means)
41 PC control section (character action control means)
41a movement control section (movement control means)
41b stance control section (stance control means)
25 operation unit
251 first operation unit
252 second operation unit (volume switch)

The invention claimed is:

1. A computer device including a processor configured to execute instructions stored in non-transitory memory, the instructions comprising:
 a generating module which generates a virtual game space; and
 a control module which controls an action of a player character within the virtual game space corresponding to a user's operation;
 wherein the control module includes:
  a movement control module which causes the player character to move corresponding to the user's operation to a first operation unit; and
  a stance control module which changes a variation in the player character's stance changed from a reference stance corresponding to an amount of the user's operation to a second operation unit which is different from the first operation unit and outputs a signal corresponding to an amount of the user's operation when the second operation unit is in the desired position between a non-operated position and a maximum operated position,
  wherein the stance control module changes a variation in a player character's shooting stance corresponding to the amount of the user's operation to the second operation unit; and
  wherein the stance control module changes accuracy of a weapon used for shooting by the player character, in addition to the variation in the shooting stance and corresponding to the variation in shooting stance, corresponding to the amount of the user's operation to the second operation unit.

2. A computer device including a processor configured to execute instructions stored in non-transitory memory, the instructions comprising:
 a generating module which generates a virtual game space; and
 a control module which controls an action of a player character within the virtual game space corresponding to a user's operation;
 wherein the control module includes:
  a movement control module which causes the player character to move corresponding to the user's operation to a first operation unit; and
  a stance control module which changes a variation in the player character's stance changed from a reference stance corresponding to an amount of the user's operation to a second operation unit which is different from the first operation unit and outputs a signal corresponding to an amount of the user's operation when the second operation unit is in the desired position between a non-operated position and a maximum operated position,
  wherein the stance control module changes a variation in a player character's stance of opening or closing a door corresponding to the amount of the user's operation to the second operation unit, and changes degree of door opening and sound made when the player character opens or closes the door corresponding to the player character's stance of opening or closing the door and corresponding to the amount of the user's operation to the second operation unit.

3. A computer device including a processor configured to execute instructions stored in non-transitory memory, the instructions causing the computer device to execute steps of:
 generating a virtual game space; and
 controlling an action of a player character within the virtual game space corresponding to a user's operation;
 wherein the step of controlling the action of the player character includes:
  causing the computer device to move the player character corresponding to the user's operation to a first operation unit; and
  changing a variation in a player character's stance from a reference stance corresponding to an amount of the user's operation to a second operation unit which is different from the first operation unit and outputs a signal corresponding to an amount of the user's operation when the second operation unit is in the desired position between a non-operated position and a maximum operated position,
  wherein the step of changing the variation changes a variation in a player character's shooting stance corresponding to the amount of the user's operation to the second operation unit; and
  wherein the step of changing the variation changes accuracy of a weapon used for shooting by the player character, in addition to the variation in the shooting stance and corresponding to the variation in shooting stance, corresponding to the amount of the user's operation to the second operation unit.

4. A computer device including a processor configured to execute instructions stored in non-transitory memory, the instructions causing the computer device to execute steps of:
 generating a virtual game space; and
 controlling an action of a player character within the virtual game space corresponding to a user's operation;
 wherein the step of controlling the action of the player character includes:
  causing the computer device to move the player character corresponding to the user's operation to a first operation unit; and
  changing a variation in a player character's stance from a reference stance corresponding to an amount of the user's operation to a second operation unit which is different from the first operation unit and outputs a signal corresponding to an amount of the user's operation when the second operation unit is in the desired position between a non-operated position and a maximum operated position,
  wherein the step of changing the variation changes a variation in a player character's stance of opening or closing a door corresponding to the amount of the user's operation to the second operation unit, and degree of door opening and sound made when the player character opens or closes the door corresponding to the player character's stance of opening or closing the door and corresponding to the amount of the user's operation to the second operation unit.

5. A method of controlling a processor of a computer device that executes instructions contained in non-transitory memory, the method comprising steps of:
 generating a virtual game space; and
 controlling an action of a player character within the virtual game space corresponding to a user's operation;

wherein the step of controlling the action of the player character includes:
    causing the computer device to move the player character corresponding to the user's operation to a first operation unit; and
        changing a variation in a player character's stance from a reference stance corresponding to an amount of the user's operation to a second operation unit which is different from the first operation unit and outputs a signal corresponding to an amount of the user's operation when the second operation unit is in the desired position between a non-operated position and a maximum operated position,
    wherein the step of changing the variation changes a variation in a player character's shooting stance corresponding to the amount of the user's operation to the second operation unit; and
    wherein the step of changing the variation changes accuracy of a weapon used for shooting by the player character, in addition to the variation in the shooting stance and corresponding to the variation in shooting stance, corresponding to the amount of the user's operation to the second operation unit.

6. A method of controlling a processor of a computer device that executes instructions contained in non-transitory memory, the method comprising steps of:

generating a virtual game space; and
controlling an action of a player character within the virtual game space corresponding to a user's operation;
wherein the step of controlling the action of the player character includes:
    causing the computer device to move the player character corresponding to the user's operation to a first operation unit; and
    changing a variation in a player character's stance from a reference stance corresponding to an amount of the user's operation to a second operation unit which is different from the first operation unit and outputs a signal corresponding to an amount of the user's operation when the second operation unit is in the desired position between a non-operated position and a maximum operated position,
    wherein the step of changing the variation changes a variation in a player character's stance of opening or closing a door corresponding to the amount of the user's operation to the second operation unit, and degree of door opening and sound made when the player character opens or closes the door corresponding to the player character's stance of opening or closing the door and corresponding to the amount of the user's operation to the second operation unit.

* * * * *